March 11, 1924.

W. E. HOKE 1,486,341

METHOD OF AND MACHINE FOR MAKING GAUGES AND OTHER ARTICLES

Filed April 12, 1919   2 Sheets-Sheet 1

INVENTOR,
William E. Hoke
BY S. Jay Teller
ATTORNEY.

Patented Mar. 11, 1924.

1,486,341

UNITED STATES PATENT OFFICE.

WILLIAM E. HOKE, OF ST. LOUIS, MISSOURI, ASSIGNOR TO PRATT & WHITNEY COMPANY, OF NEW YORK, N. Y., A CORPORATION OF NEW JERSEY.

METHOD OF AND MACHINE FOR MAKING GAUGES AND OTHER ARTICLES.

Application filed April 12, 1919. Serial No. 289,591.

*To all whom it may concern:*

Be it known that I, WILLIAM E. HOKE, a citizen of the United States, residing at St. Louis, Missouri, have invented certain new and useful Improvements in Methods of and Machines for Making Gauges and Other Articles, of which the following is a specification.

This invention relates to a method in some respects similar to that presented in my copending application for method of making identical articles, Serial No. 252,073, filed August 30th, 1918. The invention further relates to a machine for practicing the method. The method and the machine are adapted for making gauge blocks or similar articles having identical sizes and particularly having plane parallel opposite surfaces separated from each other by an assigned dimension, with a degree of accuracy hitherto unattainable. An important and characteristic part of the method consists in lapping the gauge blocks or other articles between two opposed flat laps which are relatively adjustable as to parallelism. During lapping the several blocks are preferably permitted to individually adjust themselves and at intervals certain blocks are transferred or transposed in such a way as to distribute any initial variations in length. In this way the blocks are provided with opposite parallel flat faces at identical distances apart. In accordance with the invention the accuracy of the finished blocks as to flatness or parallelism or identity is not directly dependent on any previous accuracy in the construction or adjustment of the mechanism or apparatus that is used.

Another important part of the invention consists in making a large number of blocks or articles of identical size as aforesaid and of measuring the combined size of all or a convenient number of the pieces put together, in order to ascertain the size of the individual pieces. The fact is that the individual error in any piece may be so small that it could not be detected by any known means, yet when the errors in all the pieces are put together they form an amount easily measured by ordinary means. By the method of dividing and subdividing herein described any standard of length such, for instance, as the standard yard or meter may be divided into as small parts as desired with great accuracy. The measurement of the identical blocks in multiple as described, combined with their reduction to identical lengths or sizes as also described, makes it possible for the lengths or sizes to be determined with an accuracy that is in excess of and not directly dependent upon the accuracy of the measuring instrument that is used.

While the invention in its broader aspects is adapted for making a wide variety of articles, it is particularly applicable for making gauge blocks such as presented in my copending applications for precision gauges, Serial No. 299,945, filed May 26th, 1919, and Serial No. 288,787, filed April 9th, 1919.

This application, as to a part of its subject matter, constitutes a continuation of my copending application for method of and machine for making gauges and other articles, Serial No. 242,482 filed June 28th, 1918.

In the accompanying drawings I have illustrated several embodiments of the mechanical features of my invention and the preferred way of practicing my improved method, but it will be understood that the drawings are for illustrative purposes only and are not to be construed as defining or limiting the invention, the claims appended to the specification being relied upon for that purpose.

The blocks to be lapped are first formed with the desired shape and with a little more than the desired length, by any usual or preferred means. When they are to be used as gauges the blocks are hardened and otherwise suitably treated, but these preliminary steps constitute no part of the present invention. After the blocks have been thus formed and treated, they are then subjected to a lapping operation or a series of lapping operations and are otherwise acted upon, in the manner to be described.

Figure 1:
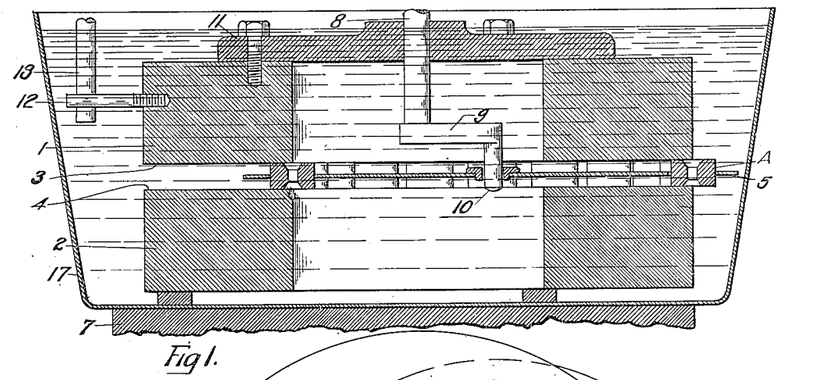
Fig. 1 is a vertical sectional view of a machine adapted for carrying out my improved method.
Figures 2, 3, 4, 5:
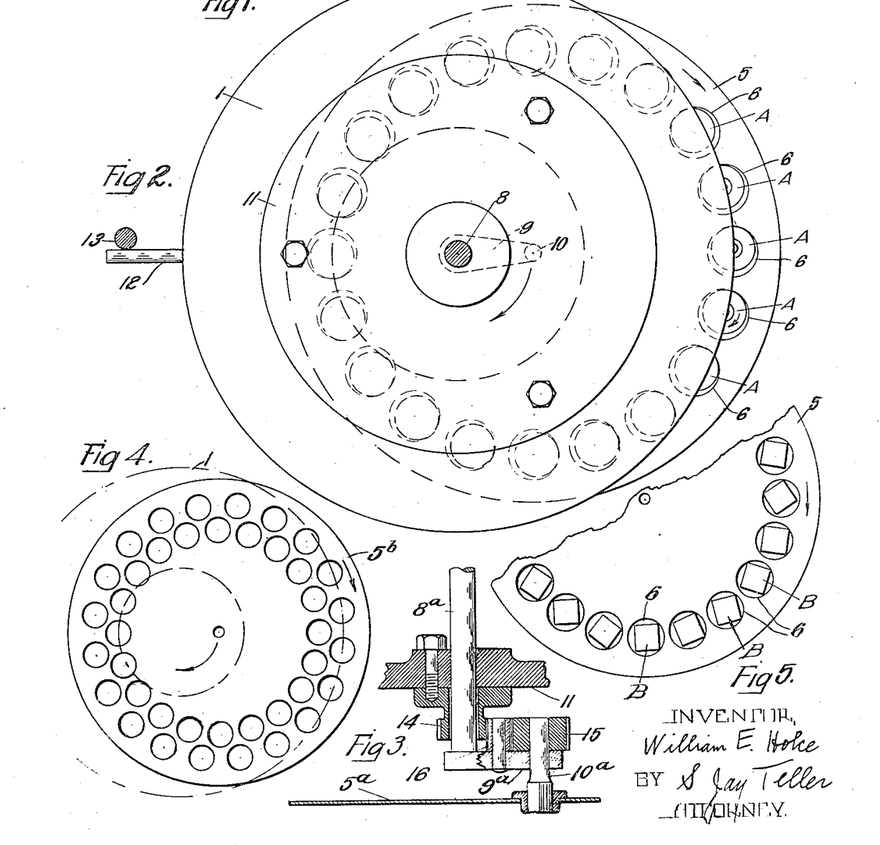
Fig. 2 is a plan view of the principal parts of the machine shown in Fig. 1.
Fig. 3 is a fragmentary sectional view of an alternate form of machine adapted for carrying out the method.
Fig. 4 is a diagrammatic view illustrating a different arrangement of gauge blocks.
Fig. 5 is a diagrammatic view illustrating the fact that square as well as circular blocks may be made by means of my improved machine and in accordance with my improved method.

One form of machine that may be used is shown in Figs. 1 and 2. This machine includes two laps 1 and 2 of similar size having their adjacent faces 3 and 4 made as nearly flat as possible in accordance with any method for producing flat surfaces. The adjacent surfaces of the two laps are suitably prepared and are charged or supplied with an abrasive such as fine emery. The character of the laps and of the abrasive may be varied as required. A number of similar blocks are placed between the two laps 1 and 2, these blocks forming a group which may be varied widely as to arrangement, but which is preferably a circular group as shown. As illustrated in the drawings, I have shown blocks A—A having opposite flat faces; For holding the blocks in proper relationship and for other purposes, as will be presently explained, there is provided a flat plate or spider 5 preferably having suitable apertures 6 therein adapted to receive the respective blocks. In order to obtain all of the advantages of the invention, it is essential that the several blocks be loosely arranged with respect to the spider so as to be capable of individual adjustments independently of each other. Preferably the apertures 6 are larger than the blocks so as to permit turning or rolling movements between the blocks and the spider.

In order to effect lapping, relative movement is effected between the blocks and the laps, this movement preferably being effected by moving the blocks and holding the laps against any considerable movement. The laps are caused to contact with the blocks with a proper pressure and, while I do not so limit myself, this pressure is preferably secured by arranging the parts horizontally, as shown. The lower lap 2 is held by a suitable support 7 and the weight of the upper lap is utilized to secure the desired pressure between the laps and the blocks. The upper lap is preferably supported entirely by the blocks. If greater pressure is desired, additional weight can obviously be applied to the upper lap. The upper lap is entirely free as concerns vertical movement and it can adjust itself as to parallelism with the lower lap in accordance with the lengths of the blocks.

The movements of the blocks are preferably such that every part of the outer surface of each block engages every part of the working surface of the corresponding lap which is engaged by the surface of any other block. In this way all of the blocks are lapped equally. By preference the movement is such that each surface of each block engages the entire surface of the corresponding lap. As illustrated the movement is effected in part by bodily moving the spider, preferably in a circular path. I prefer to make the laps circular in outline and to provide them with circular central openings, as shown. Inasmuch as the spider is moved bodily in a circular path its center is eccentric of the laps. The degree of eccentricity is preferably such that the blocks at one side of the spider will project outward beyond the outer edges of the laps, whereas the blocks at the opposite side of the spider will project inward beyond the inner edges of the laps. Thus the laps are prevented from becoming unevenly worn. Simultaneously with the bodily circular movement the spider is preferably given a rotative movement, the blocks thus moving circumferentially around the laps. Preferably the blocks are also given a rotative movement about their own axes in addition to their bodily movements. Ordinarily the rotative movement of the blocks about their own axes is quite important if not, in fact, essential. It will be understood that this step of the process constitutes one of the features of the invention. The rotative movement is not necessarily combined with the other movements heretofore described but may be effected in other ways.

The combined bodily and rotative movement of the spider and blocks together with the supplemental rotative or rolling movement of the blocks themselves causes all parts of each block surface to move past all parts of the corresponding lap surface. At first the laps engage only the longer blocks but later, if the lapping proceeds long enough, the blocks are engaged equally and the combined movement affects all of them in the same way, as before stated, and does not tend to reduce some more than others.

For moving the spider there is preferably provided a central drive shaft 8 having a crank 9 with a crank pin 10 engaging a central aperture of the spider. When the shaft 8 is rotated the spider is moved bodily in a circular path. Suitable means is provided for preventing the laps from partaking of this bodily movement. When the laps are arranged horizontally, the bottom lap is held by the support 7. As illustrated, the upper lap is held by a plate 11 secured thereto and having a bearing on the drive shaft 8. A drill press may conveniently be utilized for supporting and operating the parts described. The support 7 may be the table of the drill press and the shaft 8 may be the spindle of the drill press.

I preferably leave the spider 5 entirely free as concerns rotative movement, the aforesaid rotative or precessional movement taking place automatically. This rotative movement usually is in the same direction as the bodily movement, as for instance the clockwise direction. Several different factors may be involved in causing the rotation of the spider. The blocks that are entirely between the laps tend to turn about their axes in the counterclockwise direction, rolling along the walls of their respective openings. When some of the blocks project beyond the edges of the laps as shown these blocks may be forced by the pressure of the spider to turn in the clockwise direction. These several turning movements of the individual blocks affect the spider in different ways and the result is that it is given a rotative movement about its axis, which movement as before stated is usually in the clockwise direction. Ordinarily the spider makes a complete revolution for every five or six revolutions, more or less, of the crank. Suitable means is provided to prevent the laps from partaking of the precessional movement of the blanks. When the laps are arranged horizontally the bottom lap is held by the support 7. As illustrated, the upper lap is held by a pin 12 projecting horizontally therefrom and engaging a suitable stationary abutment 13. While the laps are prevented from turning, they are nevertheless free to adjust themselves as to parallelism.

It may under some circumstances be desirable to effect the rotative or precessional movemment of the spider by direct mechanical means. A suitable mechanism for this purpose is illustrated in Fig. 3. The spider 5ª is connected to a shaft 10ª so as to rotate therewith, and this shaft is eccentrically journaled in a crank 9ª on a shaft 8ª. Secured to the plate 11 is a gear 14 and secured to the shaft 10ª is a non-rotatable gear 15. Mounted on the crank 9ª and meshing with the gears 14 and 15 is an idler gear 16. The bodily movement of the spider in a circular path takes place as before, this movement tending to positively turn the spider forward. However, by means of the gears 14, 16 and 15 the spider is turned relatively backward at a slower speed. The result is a slow forward rotative or precessional movement which is positively effected.

I do not limit myself to the exact arrangement of blocks as shown in Figs. 1 and 2. The arrangement may be varied, and one possible variation is shown in Fig. 4. As illustrated in this figure there are two concentric circular groups of blocks engaged by a spider 5ᵇ. The dot-and-dash lines indicate the laps and show the relative positions. This arrangement makes it possible to increase the output without greatly enlarging the size of the laps. Blocks of various shapes may be lapped, and Fig. 5 illustrates the fact that square blocks, such as B—B, can be lapped in exactly the same way as circular blocks.

Approximately equal temperature throughout all parts of the laps and the blocks is desirable during the operation of lapping, although it is not necessary to maintain the temperature at any fixed point. In order to maintain all of the parts at equal temperature the mechanism may be submerged in some liquid such, for instance, as water, oil or coal oil. This is preferably accomplished by placing a tub such as 17 in position so that liquid therein will submerge the lapping mechanism.

In accordance with my method, the machine, as shown, is operated for a reasonable time, preferably until all of the blocks have been lapped and until the laps engage all of them equally. Then the movement is stopped and one lap, ordinarily the upper lap, is removed, thus leaving the blocks exposed. Certain blocks are then transferred in such a way as to distribute any errors or variations in the respective lengths. It may be assumed that, with a group of blocks of slightly varying lengths, those at one part of the group will average longer than those at another part. Following this assumption, it will be seen that the transferring must be such that the longer and shorter blocks will be commingled, preferably one or more of the longer blocks being positioned between two or more of the shorter blocks. In order that the longer and shorter blocks may be uniformly distributed the transferring is preferably effected symmetrically.

The transferring of the blocks may be performed in a viariety of ways, but in order that the invention may be clearly understood I will describe in detail the preferred manner of transferring as applied to an arrangement of blocks such as shown. If the blocks are arranged in a circular group it is to be expected that the lengths of those at one side will have a greater average than the lengths of those on the other side. Inasmuch as the laps are flat and inasmuch as the initial lapping operation may be assumed to have been continued until all of the blocks are engaged, the result is that some one or two of the blocks at one side will have a maximum length and some one or two blocks diametrically opposite will have a minmum length. The blocks between will have lengths successively varying from the maximum to the minimum. The blocks at one side of a diametral line will have lengths greater than the average and those on the other side will have lengths less than the average. The transferring of the blocks to distribute the errors and equalize the lengths is preferably done by moving alternate blocks or alternate sub-groups of blocks to position diametrically opposite. This places the longer blocks between the shorter ones. Preferably each alternate block in the circular group is moved to a position diametrically opposite, the blocks constituting diametrically opposed pairs being thus transposed.

Figures 6, 7, 8, 9, 10, 11, 12, 13, 14, 15, 16:
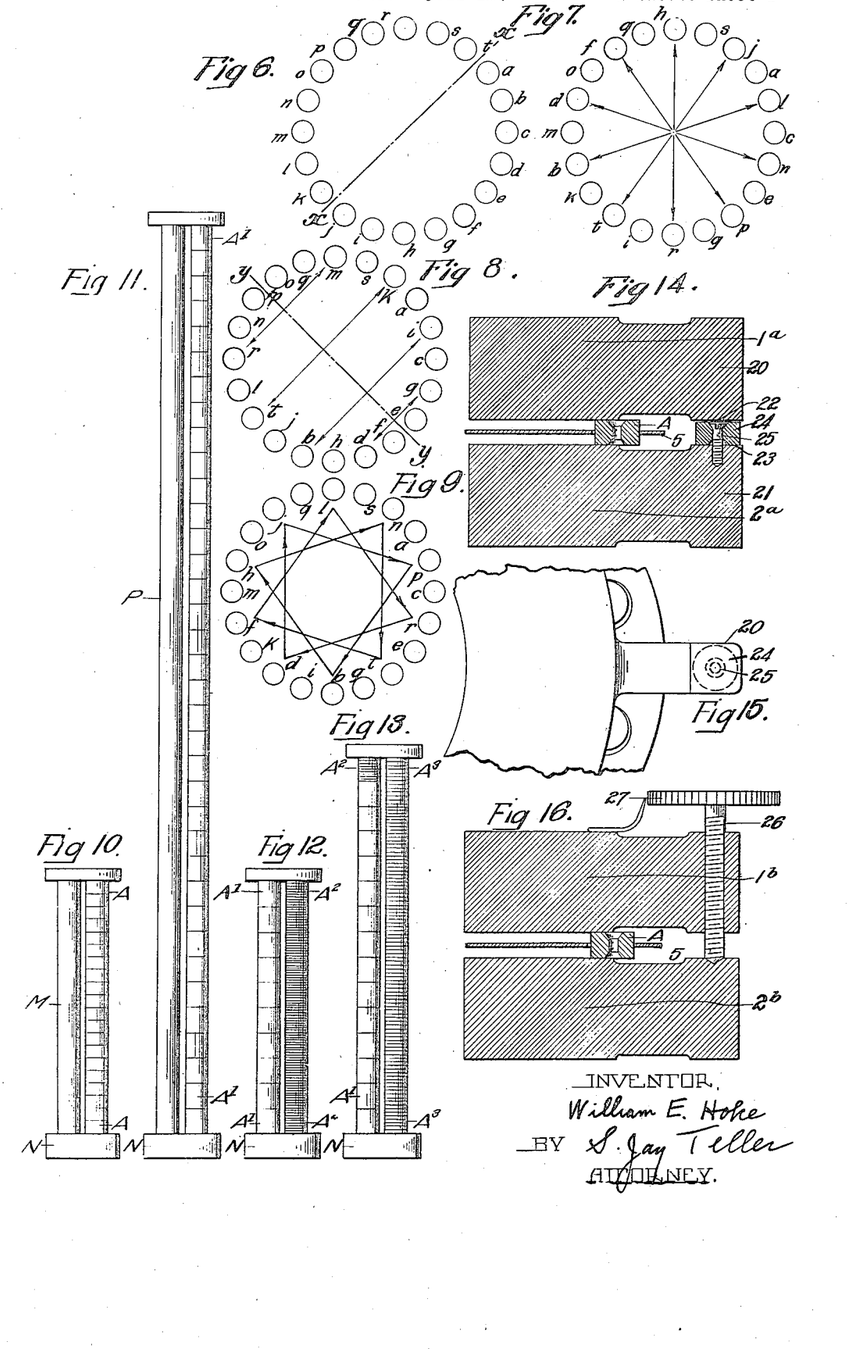
Figs. 6 to 9 are diagrammatic views illustrating the manner of transposing the gauge blocks in accordance with my improved method.
Fig. 10 is a diagrammatic view illustrating the method of measuring and checking the gauge blocks as formed by the machine shown in Figs. 1 and 2.
Figs. 11, 12 and 13 are diagrammatic views illustrating the method of dividing and subdividing a known standard of length in order to determine and check the lengths of the gauge blocks.
Figs. 14 and 15 are fragmentary sectional and plan views of another alternate form of machine.
Fig. 16 is a fragmentary sectional view of still another alternate form of machine.

Although the invention is not so limited, it is desirable for practicing my improved method in the preferred manner, that the number of blocks in any one circular group, such as $a$ to $t$ as shown in Fig. 6, should be a multiple of four and at least eight. By way of example, I have shown twenty blocks, but it will be understood that any desired multiple of four may be used. If it be assumed for instance that the blocks at one side of a diametral line $x$—$x$, have lengths greater than the average and that the blocks at the other side of the line have lengths less the average, then it will be seen that after the diametral transposition of alternate blocks the longer and shorter blocks will, in the main, be alternately arranged as shown in Fig. 7. The operator has no means of determining the position of the diametral dividing line $x$—$x$ and no means of determining which is the side of maximum length and which the side of minimum length, but it is not necessary for him to do so. It will be observed that inasmuch as the alternate blocks throughout the entire group are transposed, the required alternate arrangement of longer and shorter blocks is secured irrespective of the position of the dividing line. In the case of an arrangement such as shown in Fig. 4 the blocks of each group are transposed with each other, but those of the two groups are not mixed.

The blocks having been transferred as described, the upper lap is restored to position and the lapping operation is repeated. Obviously the laps will at first engage only the longer blocks, thus reducing their lengths. The lapping operation is continued preferably until the laps again engage all of the blocks. Obviously the blocks are more nearly uniform in length than before but there may still be some variation. Therefore alternate blocks are again transferred, as before described, and the blocks are again lapped. These operations are repeated alternately in succession for a number of times, and the final result is that all of the blocks have exactly the same length and have their end surfaces exactly flat and parallel.

The manner of transferring as described and as shown in Fig. 7 may be varied at intervals by the manner of transposition shown in Fig. 8 or that shown in Fig. 9. Fig. 8 shows each alternate block moved chordally to the opposite side of a diametral line such as $y$—$y$. Fig. 9 shows certain of the blocks, preferably alternate ones, moved chordally through a certain angle, the angle as illustrated being 108°. As before stated, the transferring can be effected in a variety of ways, and Figs. 7 to 9 are merely intended to be illustrative of typical ways in which transferring can be effected.

The blocks having been made with identical lengths and with flat parallel end surfaces, the lapping operation is then continued to reduce the lengths to the desired predetermined amount. If considerable additional lapping is required to secure the desired uniform length, it may be preferable to continue the transferring of the blocks from time to time to avoid any possible variations.

For work requiring the highest degree of accuracy I prefer to leave the laps entirely free as concerns their approaching movement and to control their spacing solely by the blocks with which they are in lapping engagement, at least during the final stages of the operation. The lapping operations are stopped from time to time and one or more of the blocks are taken out and measured, to ascertain the excess over the desired size or length, and by noting the excess the operator with a little experience can tell approximately the additional time or the additional number of turns required for lapping the blocks to size. Usually the operator will make several trial measurements before reaching the exact size.

From the foregoing description it will be seen that the method followed is such that the gauge blocks or other articles are necessarily provided with opposite parallel flat faces at identical distances apart, the parallelism, the flatness and the identity not being dependent upon any accuracy of construction of the apparatus that is used. Obviously, all the parts of the apparatus except the lapping surfaces of the laps can be of crude construction without affecting in any way the accuracy of the finished blocks. As concerns the lapping surfaces, it is desirable that these be as flat as possible but it is impossible to make them as accurate as the surfaces which are produced on the blocks. It is a well known principle of machine operation that ordinarily a machine can produce nothing more accurate than itself and usually it produces something less accurate. By the present invention I am able to make a product which is much more accurate than the machine or apparatus that is used for producing it.

For measuring the blocks it is impossible to use ordinary methods of direct measurement for the reason that the required accuracy is beyond the limits of the usual measuring devices. I therefore take advantage of the fact that as the result of the method of reducing or lapping the blocks, the sizes or lengths of all of those made at one time and in the same series are so nearly the same that variations are negligible even when an accuracy within a millionth of an inch is desired. In other words, as the result of the lapping operation as before described the sizes or lengths of the blocks are so near to theoretical mathematical identity that the variations, if any, are so small as to be incapable of observation or measurement by any of the ordinary devices or mechanisms used for comparison or measurement. A number of identical blocks made at one time are placed together to form a stack or row having a total length supposedly the same as that of some known standard, and the built-up rod is compared with the standard. The errors of the individual blocks, if any, are known to be the same, and they are thus added and can be readily measured.

In the case of blocks such as A—A, the end surfaces are so perfectly plane or flat that the blocks will adhere when wrung together with a sliding motion. The drawings show a group of twenty blocks A—A which, by way of example, may be assumed to be each nominally one-half of the unit of length, which may be the inch. The total lengths of all of the blocks placed end to end is nominally ten units, and if a ten-unit standard is available direct comparison can be made. As shown in Fig. 10 the twenty blocks A—A are wrung together and the stack of blocks and a ten-unit standard M are placed together on a surface plate N. Preferably the standard and the blocks are brought to the exact temperature at which the standard is correct, as for instance by submerging in a liquid having the said temperature. Then comparison is made between the standard and the stack of blocks by any desired method. Inasmuch as all of the blocks are identical it will be seen that the errors are multiplied and that a very minute error in the individual blocks will result in a variation of length of the entire stack which can be readily measured. For the particular example illustrated it will be seen that an error of one ten-thousandth of an inch in the total length would indicate an error of one-twentieth of a ten-thousandth of an inch or one two-hundred-thousandth of an inch in each block. As before stated the operator makes several trial measurements before the lapping is completed and by using refined methods and apparatus for measuring he can lap the blocks to an accuracy within one one-millionth of an inch or less.

The method of making and arriving at the sizes of the several gauge blocks which comprise a set is very simple and at the same time probably the most accurate known method of dividing and subdividing any standard of length, and is also absolutely self-sufficient. It does not require the assistance of any other measuring instrument whatever, but by very direct and natural operations, any standard of length my be divided and subdivided into the smallest conceivable parts with an ease and simplicity which almost precludes the possibility of error.

If it be assumed that the primary standard available is the yard, the procedure of dividing the said standard yard is as follows: Thirty-six gauge blocks $A^1$—$A^1$ are made in the manner described, so that the combined lengths of the entire thirty-six, when they are placed or wrung together, exactly equals the standard yard P, as shown in Fig. 11. Since there are thirty-six inches in a yard, and since all of the thirty-six blocks are identical in length, the length of each of them is exactly one inch.

Assuming that the inches are to be divided decimally, the first subdivision will be to tenths of inches. This is done by making one hundred blocks $A^2$—$A^2$, whose combined length as shown in Fig. 12 equals ten of these inch gauge blocks $A^1$—$A^1$ already made. Since there are one hundred tenths of an inch in ten inches, and since all of the one hundred blocks are identical in length, the length of each of them is exactly one-tenth of an inch. The same result will be arrived at if ninety blocks are made, whose combined length is nine inches; or eighty whose combined length is eight inches; or ten, whose combined length is one inch. Thus it will be seen that any convenient number may be selected for comparison with gauge blocks previously made or derived from the known standard. It must be understood, however, that only gauge blocks made in the same lot or "batch" can be assembled for comparison and that it would be fatal to accuracy to mix blocks made in various lots as this system of dividing is based on the fact that all blocks made in any one lot are identical in size, but it does not follow that those in different lots would be identical in size. Similarly in the case of an arrangement such as shown in Fig. 4 only the blocks made in any one series should be assembled for measuring. It will also be understood that the more blocks lapped and measured in one lot, the greater will be the accuracy.

Having derived inch and tenth-inch gauge blocks from the standard yard it is possible, by combination of these inch and tenth-inch blocks, to produce any size whatever, down to the third place of decimals without the assistance of any other means of measuring. For example, one hundred gauge blocks $A^3$—$A^3$ are made whose combined length equals fourteen of the inch blocks $A^1$—$A^1$ and nine of the tenth-inch blocks $A^2$—$A^2$ or a rod 14.9 inches long, as shown in Fig. 13. By simply moving the decimal point two places to the left, we get .149 inches as the size of these blocks. That is to say, they are blocks adapted to serve as gauges for one hundred and forty-nine thousandths of an inch.

To further illustrate the principles and possibilities of the invention suppose one hundred identical gauge blocks of any length whatever are to be measured with a standard rod of equal length. If the error in each of the one hundred blocks is one one-thousandth part of an inch each, their combined error would be one-tenth of an inch, which can easily be seen at a distance with the naked eye. If the individual error is only a ten-thousandth of an inch, which is really very high grade mechanical work, it amounts to one hundredth inch total, an amount easily seen with the naked eye at close range. If the individual error is a one-hundred-thousandth of an inch, which is closer than any but the very highest grade mathematical work, yet this minute error when combined forms a thousandth part of an inch, which can easily be felt by the ball of the thumb or by the finger-nail if the two surfaces are closely adjacent. If the individual error is as small as a millionth of an inch, yet when combined it amounts to a ten-thousandth of an inch, which can be tested by placing a small straight edge across and looking for the streak of light underneath. It will therefore be seen that with unaided vision and a straight edge it is possible to check the individual error within a millionth of an inch. Finally, by wringing a plane piece across, which is claimed to be an accurate test within very close limits, or by using optical methods, the accuracy of the individual gauges can be checked within a very small fraction of a millionth of an inch, which is an amount inconceivably small, all without the aid of any measuring devices whatever relying only on the sense of sight, touch, etc.

From the foregoing description it will be seen that by my invention I not only provide for the making of gauge blocks or other articles with opposite parallel flat faces and having indentical sizes with an accuracy greater than that of the apparatus used, but I also provide for the making of the said gauge blocks or other articles with predetermined or assigned lengths or sizes which have a degree of accuracy greater than that of the measuring instrument or apparatus that is used. In practising the invention mathematical principles and original methods are used so as to generate the required surfaces in the desired relation to each other and at the desired distances apart without direct dependence upon other previously constructed mechanical parts.

Under some circumstances it may be preferable to use stops for limiting the approaching movement of the laps at least during the earlier stages of the operation. In fact, for work not requiring the highest degree of accuracy the stops can be relied upon for finally limiting the lapping and thus determining the lengths of the blocks. In Figs. 13 and 14 I have shown a modified form of machine which includes stops. Two laps $1^a$ and $2^a$ are provided respectively with arms 20 and 21, of which there are three each, preferably equally spaced. The arms are provided with contact surfaces 22 and 23 in the same planes as the working surfaces of the laps. Between the contact surfaces of each set of arms there is placed a spacing or stop block 24 which may conveniently be a stop block formed by a previous lapping operation. The gauge block may be held in place by means of a screw 25.

The lapping operation may be continued in the way already described until the entire weight of the upper lap rests upon the stop blocks 24. Inasmuch as every part of the surface of each block being lapped passes every part of the corresponding lap surface, it will be seen that all of the blocks will be lapped with the same length and with flat parallel faces, notwithstanding possible minor variations in the lapped surfaces or in the length of the stop blocks 24. For work not requiring the highest accuracy, it is possible to use the stop blocks and to rely upon them for determining the length of the blocks being lapped without resorting to any transposition of the blocks, as has been heretofore described. It is not possible, however, to rely upon the stop blocks for work requiring the greatest accuracy as minor variations in the stop blocks themselves and in the laps will affect the lapping operation so as to make it impossible to secure the desired degree of accuracy as to length.

Even for very accurate work it may sometimes be desirable to use the stops during the preliminary stages of the lapping, making the stops long enough so that there is no possibility of the work being lapped too much. Then the stops can be removed and the lapping finished by the method heretofore described.

In lieu of the stop blocks shown in Figs. 14 and 15 it may sometimes be preferable to use stop screws 26, as shown in Fig. 16. Each screw 26 carries a graduated wheel 27 for indicating the adjustment thereof.

The use of stops for finally limiting and determining the length of the blocks is not herein claimed specifically, as this subject matter is presented in my aforesaid copending application Serial No. 242,482.

What I claim is:

1. The method of reducing a number of similar blocks to produce parallel flat end faces and identical lengths, which consists in arranging the several blocks in a group between two opposed flat laps, force being applied to one of the laps to cause constant pressure between the laps and the blocks, causing movement between the entire group of blocks and the laps, and causing the blocks to simultaneously turn about individual axes perpendicular to the laps.

2. The method as set forth in claim 1 characterized by a rotative movement between the blocks and the laps about a central axis.

3. The method as set forth in claim 1 characterized by the arrangement of the several blocks in a circular group and by a rotative movement between the blocks and the laps about the center of the group.

4. The method as set forth in claim 1 characterized by a rotative movement between the blocks and the laps about a central axis and further characterized by the bodily movement of the entire group of blocks in a circular path about a center eccentric of the center of rotation.

5. The method as set forth in claim 1 characterized by the arrangement of the several blocks in a circular group and by the rotative movement between the blocks and the laps about the center of the group and further characterized by the bodily movement of the entire group of blocks in a circular path about a center eccentric of the center of rotation.

6. The method of reducing a number of similar blocks to produce parallel flat end faces and identical lengths, which consists in arranging the several blocks in a group between two opposed flat laps, force being applied to one of the laps to cause constant pressure between the laps and the blocks, causing bodily movement between the entire group of blocks and the laps in a circular path, and permitting the action of the blocks to automatically cause rotative movement of the entire group about a central axis.

7. The method of reducing a number of similar blocks to produce parallel flat end faces and identical lengths, which consists in arranging the several blocks in a circular group between two opposed flat laps, force being applied to one of the laps to cause constant pressure between the laps and the blocks, causing bodily movement between the entire group of blocks and the laps in a circular path about a center eccentric of the center of the group, and permitting the action of the blocks to automatically cause rotative movement of the entire group about the center thereof.

8. The method of reducing a number of similar blocks to produce parallel flat end faces and identical lengths, which consists in closely arranging the several blocks between two opposed flat laps in a group of which the several blocks are individually adjustable, the said laps being permitted to relatively adjust themselves as to parallelism in accordance with the lengths of the blocks and being held against any considerable relative movement, force being applied to one of them to cause constant pressure between the laps and the blocks, causing movement between the blocks and the laps to effect lapping, and periodically transferring some of the blocks to distribute variations in length.

9. The method as described in claim 1 characterized by permitting the laps to relatively adjust themselves as to parallelism in accordance with the lengths of the blocks.

10. The method as described in claim 5 characterized by permitting the laps to relatively adjust themselves as to parallelism in accordance with the lengths of the blocks.

11. The method of reducing a number of similar blocks to produce parallel flat end faces and identical lengths, which consists in arranging the several blocks in a definite group between two opposed flat laps, permitting the laps to adjust themselves as to parallelism in accordance with the lengths of the blocks, causing movement between the blocks and the laps to effect lapping, transferring some of the blocks to distribute variations in length, and repeating the lapping and transferring operations alternately until identical lengths are obtained.

12. The method as set forth in claim 11 characterized by permitting relative freedom of adjustment of the individual blocks with respect to each other.

13. The method as set forth in claim 11 characterized by the symmetrical transferring of the blocks.

14. The method as set forth in claim 11 characterized by the arrangement of the blocks in a circular group and by the symmetrical transposing of the blocks diametrically.

15. The method as set forth in claim 11 characterized by the arrangement of the blocks in a circular group and by the symmetrical transposing of alternate blocks diametrically throughout the entire group.

16. The method as set forth in claim 11 characterized by the arrangement of the blocks in a circular group and by the symmetrical transposing of some of the blocks chordally.

17. The method as set forth in claim 11 characterized by the movement of the blocks so that every part of each end surface of each block engages every part of the entire working surface of the corresponding lap.

18. The method as set forth in claim 11 characterized by the bodily movement between the entire group of blocks and the laps and by the simultaneous turning of the blocks about individual axes perpendicular to the laps.

19. The method as set forth in claim 11 characterized by the bodily movement between the entire group of blocks and the laps, by a rotative movement of the blocks and the laps about a central axis and by the simultaneous turning of the blocks about individual axes perpendicular to the laps.

20. The method as set forth in claim 11 characterized by a rotative movement between the blocks and the laps about a central axis and by the bodily movement of the entire group of blocks in a circular path about a center eccentric of the center of rotation, and further characterized by the simultaneous turning of the blocks about individual axes perpendicular to the laps.

21. The method as set forth in claim 11 characterized by the arrangement of the several blocks in a circular group and by a rotative movement between the blocks and the laps about the center of the group, and further characterized by the bodily movement of the entire group of blocks in a circular path about a center eccentric of the center of rotation and by the simultaneous turning of the blocks about individual axes penpendicular to the laps.

22. The method of making a number of similar blocks with parallel flat end faces and with predetermined identical lengths, which consists in subjecting the blocks to a reducing operation whereby they are formed with opposite parallel flat surfaces and identical lengths greater than the predetermined length, stopping the reducing operation and wringing the blocks together end to end, comparing the total length of the stack of blocks with a known standard having a length equal to the sum of the predetermined identical lengths and observing the excess, again subjecting the blocks to the reducing operation, and repeating the reducing and comparing operations alternately until the total length of the stack exactly equals that of the standard.

23. The method as set forth in claim 22 in which the said reducing is effected by arranging the several blocks in a definite group between two opposed flat laps permitting the laps to adjust themselves as to parallelism in accordance with the lengths of the blocks, causing movement between the blocks and the laps to effect lapping, transferring some of the blocks to distribute variations in length and repeating the lapping and transferring operations alternately until identical lengths are obtained.

24. The method of making a number of similar blocks with parallel flat end faces and with predetermined identical lengths, which consists in making a preliminary group of blocks as set forth in claim 22, and making the desired group of blocks as set forth in claim 22 but with different lengths and using some of the blocks of the preliminary group as a standard.

25. The method of making a number of similar blocks with opposite parallel flat end faces and with predetermined identical lengths, which consists in making a preliminary group of blocks as set forth in claim 23, making a secondary group of blocks as set forth in claim 23 but with different lengths and using some of the blocks of the preliminary group as a standard, and making the desired group of blocks as set forth in claim 23 but with still different lengths and using a combination of blocks of the preliminary and secondary groups as a standard.

26. A lapping machine including in combination, two opposed laps having flat working surfaces, a spider positioned between the laps and having openings therein for blocks to be lapped, and means for effecting bodily movement between the spider and the laps in a circular path, the said means leaving the spider free to rotate about a central axis under the influence of the blocks.

27. A lapping machine as set forth in claim 26 having the openings in the spider arranged in a circular group and having the moving means engaging the spider at the center of the group.

28. A lapping machine as set forth in claim 27 having the openings in the spider circular in shape and arranged in a circular group and having the moving means engaging the spider at the center of the group.

29. A lapping machine including in combination, two opposed laps having flat working surfaces and mounted for free relative adjustment as to parallelism, a rotatable spider positioned between the laps and having openings therein for blocks to be lapped, and means for effecting bodily movement between the spider and the laps in a complete circular path.

30. A lapping machine as set forth in claim 29 having the openings in the spider arranged in a circular group and having the moving means engaging the spider at the center of the series.

31. A lapping machine including in combination, two opposed laps having flat working surfaces, one of the laps being adapted to float with respect to the other, a spider positioned between the laps and having circular openings therein for blocks to be lapped, and means for effecting bodily movement between the spider and the laps in a circular path.

32. A lapping machine including in combination, two opposed laps having flat working surfaces, one of the laps being adapted to float with respect to the other, a spider positioned between the laps and having circular openings therein for blocks to be lapped, the spider being rotatable about a central axis, and means for effecting bodily movement between the spider and the laps in a circular path.

In testimony whereof, I hereto affix my signature.

WILLIAM E. HOKE.